(12) United States Patent
Florencio et al.

(10) Patent No.: US 6,549,577 B2
(45) Date of Patent: *Apr. 15, 2003

(54) COMPUTATIONAL RESOURCE ALLOCATION IN AN INFORMATION STREAM DECODER

(75) Inventors: Dinei Afonso Ferreira Florencio, Plainsboro, NJ (US); Smith Freeman, Skillman, NJ (US); Glenn Arthur Reitmeier, Yardley, PA (US)

(73) Assignee: Sarnoff Corporation, Princeton, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/160,729

(22) Filed: Sep. 25, 1998

(65) Prior Publication Data

US 2002/0176506 A1 Nov. 28, 2002

Related U.S. Application Data

(60) Provisional application No. 60/060,112, filed on Sep. 26, 1997.

(51) Int. Cl.[7] .................................................. H04B 1/66
(52) U.S. Cl. ........................... 375/240.21; 375/240.02; 382/239; 348/405.1
(58) Field of Search ................................. 348/441, 445, 348/449, 451, 452, 454, 455, 555, 556, 581, 405.1, 426.1, 408.1; 375/240.25, 240.21, 240.03, 240.02, 240.12; 382/250, 239

(56) References Cited

U.S. PATENT DOCUMENTS

| | | | |
|---|---|---|---|
| 5,262,854 A | * 11/1993 | Ng | 375/240.24 |
| 5,355,328 A | 10/1994 | Arbeiter et al. | 364/724.1 |
| 5,365,276 A | * 11/1994 | Imai et al. | 348/556 |
| 5,436,665 A | 7/1995 | Ueno et al. | 348/412 |
| 5,442,400 A | 8/1995 | Sun et al. | 348/402 |
| 5,504,530 A | 4/1996 | Obikane et al. | 348/413 |
| 5,519,446 A | * 5/1996 | Lee | 348/556 |
| 5,537,157 A | * 7/1996 | Washino et al. | 348/445 |
| 5,587,742 A | * 12/1996 | Hau et al. | 348/441 |
| 5,999,220 A | * 12/1999 | Washino | 348/556 |
| 6,025,878 A | * 2/2000 | Boyce et al. | 348/556 |

FOREIGN PATENT DOCUMENTS

WO  WO 95/04348  2/1995  ............. G10L/3/02

OTHER PUBLICATIONS

"Symmetric Convolution and the Discrete Sine and Cosine Transforms", S. A. Martucci, IEEE Transactions on Signal Processing, vol. 42, No. 5, May 1994, pp. 1038–1051.

"Digital Filtering of Images Using the Discrete Sine or Cosine Transform", S. A. Martucci, SPIE Proceedings, vol. 2308, Sep. 25–29, 1994, pp. 1322–1333.

"HDTV Down–Conversion Decoder", J. Bao et al., IEEE Transactions on Consumer Electronics, vol. 42, No. 3, Aug. 1996, pp. 402–409.

* cited by examiner

Primary Examiner—Gims S. Philippe
(74) Attorney, Agent, or Firm—William J. Burke

(57) ABSTRACT

The invention comprises a method an apparatus for allocating processing resources in an information stream decoder in response to format indicia included within a compressed information stream. Specifically, the invention comprises an apparatus and method for decoding a video stream having an associated source video format to produce a decoded video stream having the same format or a different format, in which a computational resource is allocated in response to a change in format between the associated video format and the resultant video format.

29 Claims, 3 Drawing Sheets

COMPUTATIONAL RESOURCE ALLOCATION IN AN INFORMATION STREAM DECODER

The invention claims benefit of U.S. Provisional Application No. 60/060,112, filed Sep. 26, 1997 and incorporated herein by reference in its entirety.

The invention relates to video processing systems generally, and more particularly, video processing systems capable of receiving and processing a plurality of video signal formats, such as the various high definition and standard definition formats.

BACKGROUND OF THE DISCLOSURE

Present television receivers, such as NTSC (National Television Standards Committee) television receivers, include video processing circuitry that typically must process a video signal conforming to only a single, predetermined video format. Future digital television (DTV) receivers are expected to be implemented substantially in accordance with the transmission standards established by the Advanced Television Standards Committee (ATSC). A similar standard is the European Digital Video Broadcasting (DVB) standard. A compressed digital video system is described in the ATSC digital television standard document A/53, incorporated herein by reference. Moreover, the Moving Pictures Experts Group (MPEG) has promulgated several standards relating to digital data delivery systems. The first, known as MPEG-1, refers to ISO/IEC standards 11172 and is incorporated herein by reference. The second, known as MPEG-2, refers to ISO/IEC standards 13818 and is incorporated herein by reference.

The new DTV standards allow broadcasters to deliver virtually any format up to 1920×1080 pixels. Specifically, DTV receivers must be capable of receiving source video comprising image sequences that vary in spatial resolution (480 lines, 720 lines, or 1080 lines), in temporal resolution (60 fps, 30 fps, or 24 fps), and in scanning format (2:1 interlaced or progressive scan). In addition, it is desirable to convert the format of the received video signal to a preferred format (i.e., a "native" format) of a display device used in conjunction with the receiver.

In one prior art approach, the format of the received television signal is subjected to electronic scan conversion (interpolation, filtering and/or decimation) to adapt the format of the television signal to a "native display format" of the display device utilized in the particular DTV receiver. Prior art arrangements utilizing this approach first decode the received television signal and decompress the video information within that signal to provide a video information stream. The video information stream is then subjected to, e.g., vertical and/or horizontal interpolation or filtering or decimation to adapt the format of the video signal to the native format of the display device. In addition, it is known to use a frame rate conversion process to adapt the frame rate (i.e., 24 Hz, 30 Hz, 60 Hz) to the frame rate native to the display processing circuitry.

The above described prior art technique for adapting multiple format television signals to a particular native display format disadvantageously utilizes the same computational resources regardless of the format of the received television signal, or the native format of the display device. Thus, even in the case of adapting a low resolution format television signal to a low resolution native display format, the computational resources used by the video decoder are the same as would be used to adapt a high resolution format television signal to a medium, low or high resolution native display format display device.

Therefore, it is seen to be desirable to adapt a computational resource utilization of a video decoder (i.e., processing and memory resources) to the type of signal format received and its appropriate decoding to a native display format of a DTV receiver or to a native processing format of a video processing system, such as a video editing system.

SUMMARY OF THE INVENTION

The invention comprises a method an apparatus for allocating processing resources in an information stream decoder in response to format indicia included within a compressed information stream. Specifically, the invention comprises an apparatus and method for decoding a video stream having an associated source video format to produce a decoded video stream having the same format or a different format, in which a computational resource is allocated in response to a change in format between the associated video format and the resultant video format.

The invention provides an efficient, multiple format video signal processing system that allocates processing resources in response to the format of a received video or television signal. The invention may be used in reformatting or transcoding video information between, e.g., various storage media, video or television standards and/or formats. The invention is also advantageously employed within a digital television (DTV) system to adapt a received video format to a native display format.

The invention is based in part on the inventor's observation that the decompression of different picture sizes require different computational resources, particularly in the case of a high resolution native display format, when smaller picture sizes are decoded (using fewer IDCT resources), greater interpolation (computation of more filter taps) is required.

In one embodiment of the invention, a video decoder architecture senses the format of a received television signal and, in response, allocates arithmetic and logic resources between inverse discrete cosine transfer (IDCT operations) and vertical and/or horizontal interpolation and/or decimation operations.

A method according to the invention, and suitable for use in a system for decoding a compressed video stream, comprises the steps of: identifying a source format of the compressed video stream; determining, using the identified source format, a computational resource requirement suitable for processing the compressed video stream to produce a decompressed video stream having an output format; allocating, in response to the determined resource requirement, computational resources for performing at least an inverse discrete cosine transform (IDCT); and processing the compressed video stream to produce the decompressed video stream having the output format.

BRIEF DESCRIPTION OF THE DRAWINGS

The teachings of the present invention can be readily understood by considering the following detailed description in conjunction with the accompanying drawings, in which.

DETAILED DESCRIPTION

The invention claims benefit of U.S. Provisional Application No. 60/060,112, filed Sep. 26, 1997, and incorporated herein by reference in its entirety.

The invention will be described within the context of an MPEG-like decoder and format converter. While the invention has great utility within a digital television (DTV) receiver, illustratively an ATSC television receiver, it will be apparent to those skilled in the art that the invention is applicable to any multiple format video processing system, including those systems adapted to DVB, MPEG-1, MPEG-2 and other information streams. For example, the invention may be used in reformatting or transcoding video information between various storage media, video or television standards and/or formats.

Figure 1:
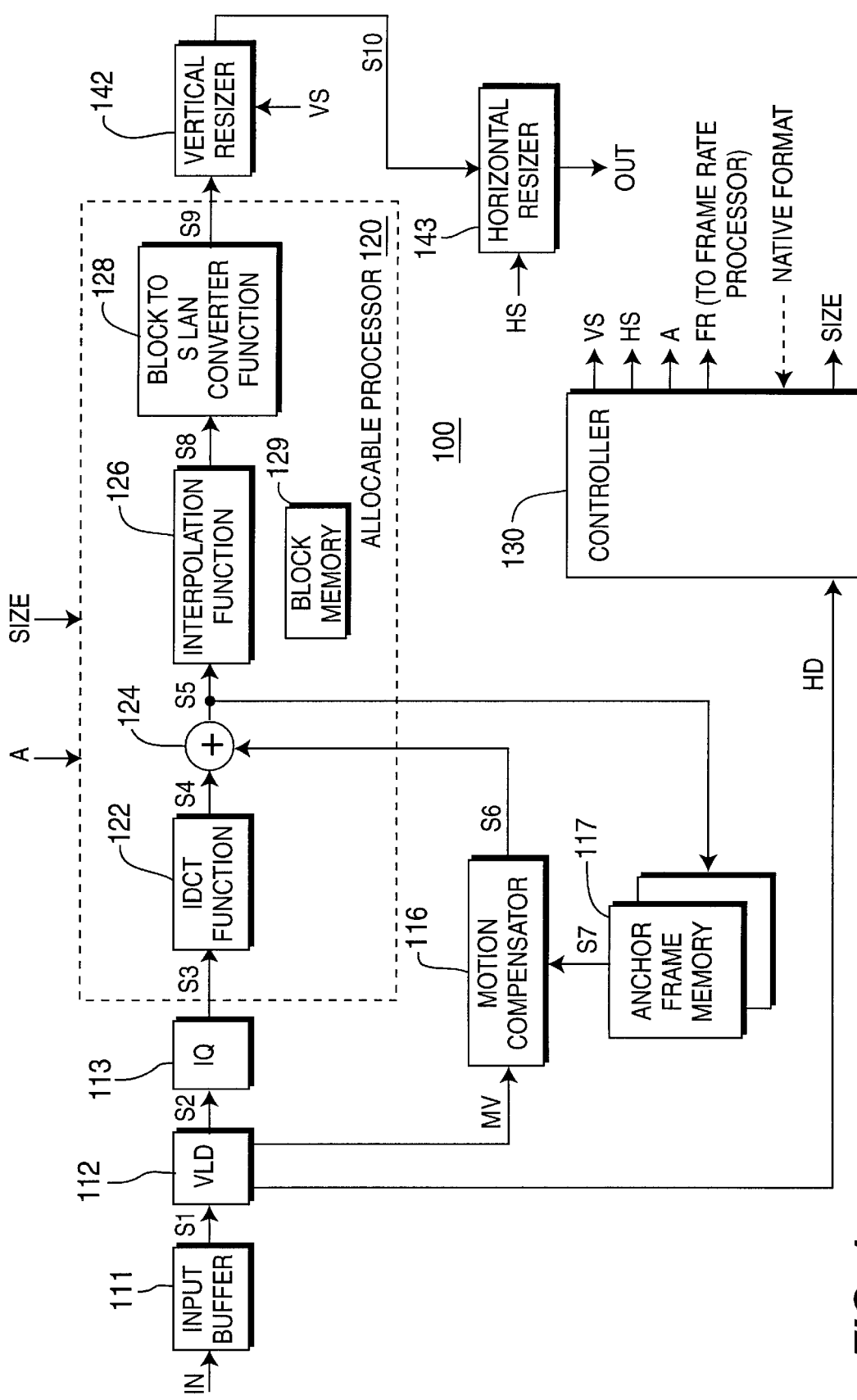
FIG. 1 depicts a high-level block diagram of a video decoder according to the invention.

FIG. 1 depicts a high-level block diagram of a video decoder according to the invention. Specifically, the video decoder and processor of FIG. 1 comprises an MPEG-like decoder that receives and decodes, on a block by block basis, a compressed video information stream IN to produce a video output stream OUT. The video output stream OUT is suitable for coupling to, e.g., a display driver circuit within a presentation device (not shown). The display format of the video output stream is adjusted by resizing operations in either the discrete cosine transform (DCT) domain or the pixel domain.

The MPEG-like decoder 100 comprises an input buffer memory module 111, a variable length decoder (VLD) module 112, an inverse quantizer (IQ) module 113, a block memory module 114, a motion compensation module 116, an anchor frame memory module 117, an allocable processor 120, an optional vertical resizer module 142, an optional horizontal resizer module 143, and a controller 130. The allocable processor 120 performs an inverse discrete cosine transform (IDCT) function 122, a summer function 124, an interpolation function 126 and a block to scan-line converter function 128. The allocable processor 120 also includes a block memory module 129 that cooperates with the various components within the allocable processor 120 to provide, e.g., intermediate storage of block domain and/or scan-line domain video information.

A vector is a set of scalar data items, all of the same kind, stored in memory. The vector elements may be ordered to have a fixed addressing increment between success elements, called a stride. A vector processor is an group of hardware resources, including vector registers, functional pipelines, processing elements and/or register counters, for performing vector operations. Vector processing occurs when arithmetic or logical operations are applied to vectors. Vector processing is distinguished from scalar processing, which operates on one or one pair of data. In general, vector processing is faster and more efficient than scalar processing, as is well known to those skilled in the art of advanced computer architectures. Due to the inherent ordering of video data (i.e., rows, columns, frames, fields and the like) and compressed video data (i.e., slices, macroblocks, blocks and the like), such data is amendable to vector processing.

The allocable processor 120 may comprise any allocable processing resource such as a vector processor, a plurality of scalar processors in a multiprocessor environment or any other processing system in which arithmetic and/or logical processing resources my be allocated using hardware, software or a combination of hardware and software. Thus, while the allocable processor 120 will be primarily described within the context of a vector processor, it must be understood that such description is for illustrative purposes only and that the invention should not be construed in any way as being limited solely to a vector processing arrangement.

It should be noted that while the allocable processor 120 of the exemplary embodiment performs an IDCT function 122, a summer function 124:, an interpolation function 126 and a block to scan-line converter function 128, it is not necessary for all of these function to be included in the allocable processor 120. The allocable processor 120 includes these functions since, within the context of the exemplary MPEG-like encoder 100 of FIG. 1, such inclusion reduces the total cost of implementing the MPEG-like encoder in terms of semiconductor area, system complexity and, therefore, unit cost. Similarly, the block memory 129 may also be a separate module.

In one embodiment of the invention allocable processor 120 includes only the IDCT function 122 and the interpolation function 126, while the summer function 124 and block to scan-line converter function 128 are implemented by dedicated hardware. Similarly, the interpolation function 126 may provide only a vertical interpolation function, only a horizontal interpolation function or both a vertical interpolation function and a horizontal interpolation function.

The input buffer memory module 111 receives the compressed video stream IN, illustratively a variable length encoded bitstream representing, e.g., a high definition television signal (HDTV) or standard definition television signal (SDTV) output from a transport demultiplexer/decoder circuit (not shown). The input buffer memory module 111 is used to temporarily store the received compressed video stream IN until the variable length decoder module 112 is ready to accept the video data for processing. The VLD 112 has an input coupled to a data output of the input buffer memory module 111 to retrieve, e.g., the stored variable length encoded video data as data stream S1.

The VLD 112 decodes the retrieved data to produce a constant length bitstream S2 comprising quantized prediction error DCT coefficients, a motion vector stream MV and a block information stream DATA. The IQ module 113 performs an inverse quantization operation upon constant length bitstream S2 to produce a DCT coefficient vector S3 comprising quantized prediction error coefficients in standard form, i.e., DCT coefficients.

The IDCT function 122 of the allocable processor 120 performs an inverse discrete cosine transform operation upon DCT coefficient vector S3 to produce a data vector S4 comprising pixel-by-pixel prediction errors. Arithmetic and/or logic resources of the allocable processor 120 are allocated to the IDCT function 122 based on several factors which will be described in more detail below. Briefly, resources are allocated based on, e.g., the video format of a received video signal, a native video format such as a native display device format, some combination of the received and native video formats and other factors.

The summer function 124 of the allocable processor 120 performs an addition operation of the pixel-by-pixel prediction error stream S4 and a motion compensated predicted pixel value stream S6 produced by the motion compensation module 116. Thus, the output of summer function 124 is, in the exemplary embodiment, a video stream S5 comprising reconstructed pixel values in pixel block format. The video stream S5 produced by summer function 124 is coupled to the anchor frame memory 117 and the interpolation function 126 of the allocable processor 120. The anchor frame memory module 117 receives and stores those pixel blocks associated with anchor frames within the compressed video stream S5.

The motion compensation module 116 receives the motion vector stream MV from the VLD 112 and accesses the image information stored in memory module 117 via signal path S7. The motion vector stream MV comprises motion vector information to be used by the motion compensation module 116 to predict individual macroblocks based upon image information stored in the anchor frame memory module 117. The motion compensation module 116 utilizes one or more stored anchor frames (e.g., the pixel blocks generated with respect to the most recent I-frame or P-frame of the video signal produced at the output of the summer function 124), and the motion vector(s) MV received from the VLD 112, to calculate the values for each of a plurality of predicted blocks. Each of the plurality of predicted blocks are then coupled to an input of summer function 124 as a motion compensated predicted pixel value stream S6.

The interpolation function 126 of the allocable processor 120 performs a vertical and/or horizontal interpolation operation to resize the pixel blocks within the video stream S5 produced by summer function 124. The amount of resizing imparted to the pixel blocks is determined with respect to a control signal SIZE produced by the controller 130. The interpolation function may comprise a vertical interpolation function, a horizontal interpolation function or both a vertical and horizontal interpolation function. The interpolation function 126 of the allocable processor 120 is used to increase the vertical and/or horizontal dimension of a pixel block such that, e.g., a relatively low resolution (e.g., SDTV) input video signal may be displayed on a relatively high resolution (e.g., HDTV) display device using as much available display area as practicably possible.

A vertical interpolation may be performed to increase a vertical dimension of a pixel block by, e.g., calculating and inserting extra lines of pixels within the pixel block. For example, an 8×8 pixel block for a 480 line picture may be increased to an 8×18 pixel block for display on a 1080 line display device.

A horizontal interpolation may be performed to increase a horizontal dimension of a pixel block by, e.g., calculating and inserting extra pixels within each line of pixels in the pixel block. For example, an 8×8 pixel block for a 640 pixel per line picture may be increased to a 16×8 pixel block for display on a 1280 pixels per line display device.

Both a vertical and a horizontal interpolation may be performed to increase both the vertical and horizontal dimensions of a pixel block by, e.g., calculating and inserting extra lines of pixels within the pixel block and calculating and inserting extra pixels within each line of pixels in the pixel block. For example, an 8×8 pixel block for a 480 line 640 pixel per line picture may be increased to a 16×18 pixel block for display on a 1080 line, 1280 pixels per line display device.

The block to scan-line converter function 128 of the allocable processor 120 performs a conversion of the interpolated, block-based video stream S8 from the block domain to the scan-line domain. That is, the block to scan-line converter function 128 of the allocable processor 120 converts block-base video stream S8 produced by interpolation function 126 into a scan-line based video stream S9. The scan-line based video stream S9 is coupled to one of optional vertical resizer 142, optional horizontal resizer 143 or the output OUT.

Optional vertical resizer 142 receives the scan-line based video stream S9 and, in response to a control signal VS from a controller 130, selectively changes the number of vertical scanning lines per frame of video information included within scan-line based video stream S9. Optional vertical resizer 142 produces a vertically resized video signal S10. Optional vertical resizer 142 is capable of increasing the number of lines per video frame by, e.g., using interpolation techniques to calculate luminance and chrominance information of one or more new lines to be inserted between two existing lines. Optional vertical resizer 142 is also capable of decreasing the number of lines per video frame by, e.g., decimating a video frame and by using interpolation techniques to calculate new scan lines at a reduced line density.

In one embodiment of the invention optional vertical resizer 142 is only used to provide a simple, 2:3 vertical interpolation to convert 720 line video into 1080 line video. In this embodiment, all other vertical interpolation functions (e.g., 480 to 720, 480 to 1080 and the like) are performed by the interpolation function 126 of the allocable processor 120.

Optional horizontal resizer 143 receives the vertically resized video signal S10 (or the scan-line based video stream S9) and, in response to a control signal HS from controller 130, selectively changes the number of picture elements (pixels) per line of video information included within received video signal S10 or S9. Optional horizontal resizer 143 produces a horizontally resized video signal OUT. Optional horizontal resizer 143 is capable of increasing the number of pixels per line by, e.g., using interpolation techniques to calculate luminance and chrominance information of one or more new pixels to be inserted between two existing pixels. Optional horizontal resizer 143 is also capable of decreasing the number of pixels per line by, e.g., decimating a video line by using interpolation techniques to reduce the number of pixels in the line.

Controller 130 receives format (e.g., number of lines, number of pixels per line, frame rate and the like), colorimetry and other information relating to the decoded video signal S4 from the VLD 112 via the header data signal HD. Controller 130 utilizes this information, and additional information, such as a native display or processing format of a display or video processor (not shown) employing the invention, to generate an optional vertical size control signal VS for optional vertical resizer 142 and an optional horizontal size control signal HS for optional horizontal resizer 143. The controller 130 may optionally be used to provide a control signal FR to a frame rate converter (not shown) for converting the frame rate of the output signal OUT to a different frame rate (e.g., 60 frames per second to 30 frames per second) in conformance with, e.g., the native display or processing format of a display or video processor employing the invention. The native format information may be stored within the controller 130 or, optionally, provided to the controller 130 via a control signal NATIVE FORMAT.

Allocable processor 120, in response to a control signal A from controller 130, allocates processing resources, illustratively vector processing resources, between the IDCT function 122 and the vertical interpolation function 126. The controller 130 causes the vector processing resources to be allocated between the two functions in response to, e.g., the format of the input video signal IN and the native display or processing format of a display or video processor employing the invention.

The allocable processor 120 also provides substantially constant resources for the summer function 124 and the block to scan-line converter function 128. However, in one embodiment of the invention, the resources allocated to the block to scan-line converter function 128 are not constant. In this embodiment the resources are allocated in a manner that adapts to the size of the pixel blocks within the block-based video stream S8 produced by the interpolation function 126. That is, if the blocks have been increased in size, then resources allocated to the block to scan-line converter function 128 are correspondingly increased to provide sufficient processing power.

Allocable processor 120, in response to the control signal SIZE from controller 130, adapts a size or resolution parameter of a block being processed. That is, a received N×M (or N×N) DCT coefficient block subjected to IDCT processing typically produces an N×M (or N×N) pixel block. If the controller 130 determines that the produced pixel block should be expanded in, e.g., the vertical direction (i.e., a 480 line block expanded for use in a 1080 line display), then the control signal SIZE will be used to indicate such expansion. In response, the vertical interpolation function will provide such expansion (e.g., convert an 8×8 pixel block into an 8×18 pixel block).

The inventor notes that the decompression of information streams comprising video information having different picture sizes requires different computational resources. For example, as the picture size of a video stream decreases, the computational resources required to implement the above-described IDCT function decreases as well (i.e., fewer DCT coefficients to process over time due to the reduced number of DCT coefficient blocks used to represent pixel information in a frame of reduced resolution video). Similarly, as the picture size of a video stream increases, the computational resources required to implement the above-described IDCT function increases as well (i.e., more DCT coefficients to process over time due to the increased number of DCT coefficient blocks used to represent pixel information in a frame of enhanced resolution video). The relationship between IDCT processing resources and picture format may be calculated or empirically determined.

The inventor further notes that since the native display or processing format of a display or video processor utilizing a decoded video stream does not typically change, it becomes necessary to resize a decoded video stream to provide a picture that maximally utilizes, e.g., an available display area of the display device. For example, assuming that an HDTV display device is used to display the decoded video stream, as the picture size of a video stream decreases, the computational resources required to implement the above-described vertical and/or horizontal interpolation function will increase (i.e., computation of more filter taps). Similarly, as the picture size of the video stream approaches the native display format (or if a "letter box" or cropping technique is used), the computational resources required to implement the above-described vertical and/or horizontal interpolation function will approach zero (i.e., no need to calculated filter taps).

It should also be noted that the computation resources requires to perform the above-described vertical and/or horizontal decimation function also varies with the picture size to native format ratio. It is also noted that frame rate differences between a transmitted video format and a native display format affects computational resource requirements. For example, if the transmitted video format comprises 24 frames per second (fps) video information (e.g., a movie), then more time becomes available to perform interpolation and, hence, interpolation filters having more taps may be used.

In one embodiment of the invention, the IDCT function 122 of the allocable processor 120 comprises a vector processor (i.e., an allocated portion of an available allocable vector processing resources 120) that performs, illustratively, an eight tap multiply/accumulate function. A local block of memory (i.e., block memory module 114), illustratively an 8×8 pixel block, is used so that both horizontal and vertical vector operations can be performed. When the transmitted video format does not require the number of IDCT operations to consume all the processing time (such as a received SDTV video stream), the unutilized computing resources are allocated to perform the interpolation filtering function.

The horizontal interpolation function is performed at the block level by interpolating, illustratively, 8×8 blocks into one of a plurality of block formats shown below in Table 1. For example, referring to Table 1, if the transmitted video format (i.e., the source format) is a 480 line format (i.e., SDTV) represented by 8×8 pixel blocks, and the display format is a 1080 line format (i.e., HDTV), then the source to display conversion factor is 4:9. As such, the vector processor resources are used to effect a 4:9 interpolation function (i.e., 480 line to 1080 line). This is accomplished by changing the size of the blocks from, in the exemplary embodiment, 8×8 blocks to 8×18 blocks. It should be noted that in the case of interlaced video represented by, illustratively, 8×4 pixel blocks, the same method is applicable.

TABLE 1

| Input Block Size | Source Format | Display Format | Conversion Factor | New Block Size |
|---|---|---|---|---|
| 8*8 | 480 line | 480 line | 1 | 8*8 |
| 8*8 | 480 | 720 | 2:3 | 8*12 |
| 8*8 | 480 | 1080 | 4:9 | 8*18 |
| 8*4 | 480 | 480 | 1 | 8*4 |
| 8*4 | 480 | 720 | 2:3 | 8*6 |
| 8*4 | 480 | 1080 | 4:9 | 8*9 |
| 8*8 | 720 | 720 | 1 | 8*8 |
| 8*8 | 720 | 1080 | 2:3 | 8*12 |
| 8*4 | 720 | 720 | 1 | 8*4 |
| 8*4 | 720 | 1080 | 2:3 | 8*12 |

It should be noted that the 1280*720 and 1920*1080 modes maximally utilize the IDCT processing resources. That is, these modes represent the case where the allocable processor 120 has allocated a substantial portion of resource to the IDCT function 122, and that this substantial portion represents a maximum IDCT function 122 resource allocation based upon, e.g., a determination of the maximum IDCT resource loading for the highest resolution (i.e., resource consuming) resolution to be processed. Since there may be no need to perform the vertical interpolation function during these modes of operation (depending on, e.g., a native display format), resources are not allocated to the interpolation function 126.

The resized pixel blocks produced by the interpolation function 126 of the allocable processor 120 are converted, by the block to scan-line converter function 128, into a plurality of scan lines. For example, in the case of an 8×8 pixel block being interpolated to produce an 8×18 pixel block, the block to scan-line converter function 128 will produce 18 video scan lines, rather than 8 video scan lines, for the pixel block. In this manner, the vertical dimension of a picture formed using the interpolated pixel blocks may be increased in the vertical direction to fully utilize, e.g., the display area of an HDTV display device. To fully utilize a horizontal display area the horizontal resizer 143 may be used to interpolate additional pixels within each scan line, thereby increasing the length or pixel count of each scan line.

The controller 130 adapts the operation of the vertical interpolation function 126 of the allocable processor 120 and the horizontal resizer 143 to produce an output video signal OUT that maximally utilizes the display area of a display device or adapts to a native or desirable video format for subsequent processing. It must be noted that the controller 130 may utilize the vertical resizer 142 to vertically resize scan-mode video data that has been previously resized by the vertical interpolation function 126 of the allocable processor 120. Therefore, the controller 130 optionally balances the resource utilization of the allocable processor 120 and the quality level of the output video stream OUT to achieve a desired video decoding and formatting purpose, such conforming an input video signal to a native display or processing format.

The interpolation function 126 of the allocable processor 120 has been described in terms of increasing the number lines and/or pixels per line of a pixel block. It must be noted that the interpolation function 126 of the allocable processor 120 is also capable of decreasing the number lines and/or pixels per line of a pixel block. In one embodiment of the invention such a decrease in the number lines and/or pixels per line is effected by decimating the lines and/or pixels per line to produce a reduced vertical and/or horizontal resolution pixel block. The decimation may be made on an integer basis (i.e., every other or every third line and/or pixels per line) or on a non-integer basis (i.e., every one and a half lines and/or pixels per line). In the latter case, a combination of decimation and interpolation is required to produce the desired vertical and/or horizontal resolution for the pixel block. This functionality will be further exploited in the embodiment of FIG. 2.

It should be noted that in the MPEG-like decoder 100 described above the IDCT function 122 of the allocable processor 120 operates on, e.g., a standard size DCT coefficient block such as an 8×8 DCT coefficient block. Thus, regardless of the received video format and, e.g., native display format, the IDCT function 122 is performed in the same manner on a consistent block size. Thus, while the MPEG-like decoder 100 includes image resizing functionality, such functionality is not within the motion compensation loop.

When it is desirable to reduce the memory required to implement the anchor frame memory 117 (e.g., an SDTV display device doesn't require HDTV motion accuracy and resolution), image reduction functionality may be included within the motion compensation loop. Such an embodiment of the invention will now be described with respect to FIG. 2.

Figure 2:
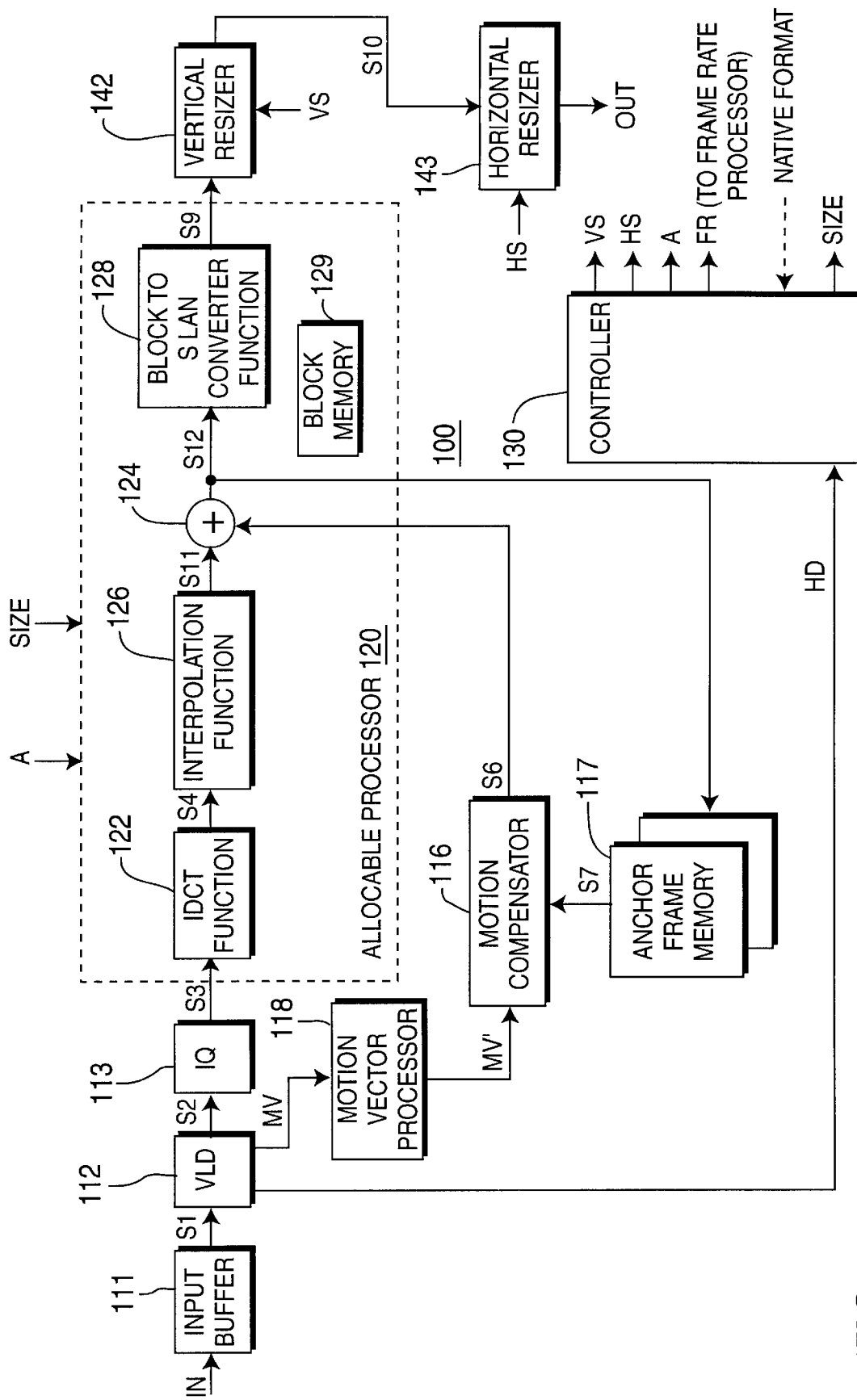
FIG. 2 depicts a high-level block diagram of an alternate embodiment of a video decoder according to the invention.

FIG. 2 depicts a high-level block diagram of a video decoder according to the invention. Specifically, the video decoder and processor of FIG. 2, like the decoder 100 of FIG. 1, comprises an MPEG-like decoder that receives and decodes, on a block by block basis, a compressed video information stream IN to produce a video output stream OUT. The video output stream OUT is suitable for coupling to, e.g., a display driver circuit within a presentation device (not shown). The display format of the video output stream is adjusted by resizing operations in either the discrete cosine transform (DCT) domain or the pixel domain.

The MPEG-like decoder 200 of FIG. 2 includes apparatus for reducing memory and memory bandwidth requirements, thereby reducing the cost and complexity of the decoder. Specifically, memory and memory bandwidth requirements are reduced by compressing image information prior to storage in the anchor frame memory 117 such that a reduced resolution image information frame is stored and subsequently utilized by the motion compensation module 116 of the decoder 200. The invention also includes a motion vector processor 118 that processes motion vector information received from the VLD 112 in a manner consistent with the amount of compression imparted to a predicted image information frame, and the type of prediction employed in forming the predicted information frame.

The MPEG-like decoder 200 comprises an input buffer memory module 111, a variable length decoder (VLD) module 112, an inverse quantizer (IQ) module 113, a block memory module 114, a motion compensation module 116, an anchor frame memory module 117, an allocable processor 120, an optional vertical resizer module 142, an optional horizontal resizer module 143, a controller 130 and a motion vector processor 118. The allocable processor 120 performs an inverse discrete cosine transform (IDCT) function 122, a summer function 124, an interpolation function 126 and a block to scan-line converter function 128. The allocable processor 120 also includes a block memory module 129 that cooperates with the various components within the allocable processor 120 to provide, e.g., intermediate storage of block domain and/or scan-line domain video information.

Since the majority of the elements of the MPEG-like decoder 200 of FIG. 2 operate in substantially the same manner as corresponding elements in the MPEG-like decoder 100 of FIG. 1, only the differences between the two figures will be discussed in detail. For example, the MPEG-like decoder 200 of FIG. 2 includes a motion vector processor 118, whereas the MPEG-like decoder 100 of FIG. 1 does not. This is because in the MPEG-like decoder 200 of FIG. 2 the interpolation function 126 of the allocable processor 120 is "within the loop" (i.e., between the IDCT function 122 and the summer function 124 of the allocable processor 120). By contrast, in the MPEG-like decoder 100 of FIG. 1 the interpolation function 126 of the allocable processor 120 is "outside the loop" (i.e., after the IDCT function 122 and the summer function 124 of the allocable processor 120). Since the interpolation function 126 increases or decreases the size of an anchor frame block used to predict other blocks according to respective motion vectors, it is necessary to adapt those motion vectors to the increased or decreased size of the respective blocks.

The input buffer memory module 111 is used to temporarily store the received compressed video stream IN until the variable length decoder module 112 is ready to accept the video data for processing. The VLD 112 has an input coupled to a data output of the input buffer memory module 111 to retrieve, e.g., the stored variable length encoded video data as data stream S1. The VLD 112 decodes the retrieved data to produce a constant length bitstream S2 comprising quantized prediction error DCT coefficients, a motion vector stream MV and a block information stream DATA. The IQ module 113 performs an inverse quantization operation upon constant length bitstream S2 to produce a DCT coefficient vector S3 comprising quantized prediction error coefficients in standard form, i.e., DCT coefficients.

The IDCT function 122 of the allocable processor 120 performs an inverse discrete cosine transform operation upon DCT coefficient vector S3 to produce a data vector S4 comprising pixel-by-pixel prediction errors. Arithmetic and/or logic resources of the allocable processor 120 are allocated to the IDCT function 122 based on the previously described factors and several factors which will be described in more detail below.

The interpolation function 126 of the allocable processor 120 performs a vertical and/or horizontal interpolation operation to resize the pixel blocks within the pixel-by-pixel prediction error data vector S4 to produce a resized pixel-by-pixel prediction error data vector S11. The amount of resizing imparted to the pixel blocks is determined with respect to a control signal SIZE produced by the controller 130. The resizing may comprise increasing (e.g., via interpolation) or decreasing (e.g., via decimation or decimation and interpolation) a vertical and/or horizontal dimension of the pixel blocks. By decreasing the size of the pixel blocks, the amount of memory resources utilized by anchor frame memory 117 may be reduced.

The summer function 124 of the allocable processor 120 performs an addition operation of the resized pixel-by-pixel prediction error data vector S11 and a motion compensated predicted pixel value data vector S6 produced by the motion compensation module 116. Thus, the output of summer function 124 is, in the exemplary embodiment of FIG. 2, a resized video data vector S12 comprising reconstructed resized pixel values. The resized video data vector S12 produced by summer function 124 is coupled to the anchor frame memory 117 and the block to scan-line converter function 128 of the allocable processor 120. The anchor frame memory module 117 receives and stores those resized pixel blocks associated with anchor frames within the resized video data vector S12.

The block to scan-line converter function 128 of the allocable processor 120 performs a conversion of the block-based resized video data vector S12 from the block domain to the scan-line domain. That is, the block to scan-line converter function 128 of the allocable processor 120 converts block-base resized video data vector S12 produced by interpolation function 126 into a scan line-based video stream S9. The scan line-based video stream S9 is coupled to one of optional vertical resizer 142, optional horizontal resizer 143 or the output OUT.

Optional vertical resizer 142 and optional horizontal resizer 143 operate in substantially the same manner as previously described. The controller 130 optionally utilizes these optional resizer in conjunction with the interpolation function 126 of the allocable processor 120 to achieve an appropriate video output signal OUT.

Referring now to FIG. 2, allocable processor 120, in response to a control signal A from controller 130, allocates processing resources between at Least the IDCT function 122 and the interpolation function 126. The controller 130 causes allocable processing resources, such as vector processing resources, to be allocated between the two functions in response to, e.g., the format of the input video signal IN and the native display or processing format of a display or video processor employing the invention.

Allocable processor 120, in response to a control signal SIZE from controller 130, adapts a size or resolution parameter of a block being processed. That is, a received N×M (or N×N) DCT coefficient block subjected to IDCT processing typically produces an N×M (or N×N) pixel block. If the controller 130 determines that the produced pixel block should be reduced in size in both the horizontal and vertical directions (i.e., an HDTV block reduced for use in an SDTV display), then the control signal SIZE will be used to indicate such reduction. In response, the IDCT function will provide such reduction (e.g., convert an 8×8 pixel block into a reduced resolution pixel block, such as a 4×4, 4×8, 2×4 or other reduced resolution M'×N' pixel block). This adaptation of the IDCT function will now be described in more detail.

The IDCT function 122 of allocable processor 120 used to provide a reduced resolution pixel block by performing the IDCT function on a subset of the DCT coefficients within a received DCT coefficient block. In this manner the interpolation function 126 does not need to be used to provide a reduced size pixel block, since the IDCT function 122 will produce such a block.

In one embodiment of the invention, a portion of the IDCT coefficients are truncated prior to the actual IDCT operation. The remaining portion (e.g., the relatively low order coefficients) of the DCT coefficient block is then subjected to an inverse DCT to produce a reduced resolution pixel block. The amount of actual reduction in resolution is determined by the number of DCT coefficients used to reconstruct the truncated pixel block. The amount of truncation is determined by the appropriate reduction level of pixel resolution, as determined by the controller with respect to the received video format and native display format, and indicated by the control signal SIZE.

Thus, the IDCT function 122 of allocable processor 120 produces a compressed video data vector S4 according to a scaling factor SF (indicated by the control signal SIZE) and having a compression ration of 1:SF. The IDCT function 122 of allocable processor 120 operates on a pixel block by pixel block basis (e.g., a 4×4, 4×8 or 8×8 pixel block) to compress each pixel block forming an anchor frame such that a resulting compressed anchor frame is provided to the anchor frame memory as compressed video data vector S5. Thus, the memory requirements of anchor frame memory module 117 are reduced by a factor of SF.

In another embodiment of the invention, where half of the DCT coefficients are truncated, and the remaining DCT coefficients are subjected to the IDCT processing, the resulting pixel block will have approximately half the resolution (i.e., a 2:1 compression ratio) of the initial pixel block (i.e., a 4×8 or 8×4 pixel block). Similarly, if three fourths of the DCT coefficients are truncated, and the remaining DCT coefficients are subjected to the IDCT processing, then the resulting pixel block will have approximately one fourth the resolution (i.e., a 4:1 compression ratio) of the initial pixel block (i.e., a 4×4 pixel block). It is important to note that the amount of reduction does not need to be a factor of two (i.e., ½, ¼ and so on). Rather, the amount of reduction may be described in any manner deemed appropriate to the application. For example, in the case of an HDTV video format stream reduced for display on an SDTV format display device, the amount of reduction (i.e., the scaling factor SF) may be described in the vertical direction as a 9:4 reduction (i.e., 1080 lines to 480 lines) and in the horizontal direction as a 3:1 reduction (i.e., 1920 pixels to 640 pixels).

The motion vector processor 130 receives the motion vector stream MV from the VLD 112 and the control signal SIZE produced by the controller 130. The motion vector stream MV comprises motion vector information to be used by the motion compensation module 116 to predict individual macroblocks based upon image information stored in the anchor frame memory module. However, since the image information stored in the anchor frame memory module 117 has been scaled by the IDCT function 122 of allocable processor 120 as described above, it is also necessary to scale motion vector data used to predict macroblocks using the scaled pixel information. The scaled motion vectors MV are coupled to the motion compensation module 116 via path MV'.

The motion compensation module 116 accesses the compressed (i.e., scaled) image information stored in memory module 117 via signal path S7' and the scaled motion vector(s) MV' to produce a scaled predicted macroblock. That is, the motion compensation module 116 utilizes one or more stored anchor frames (e.g., the reduced resolution pixel blocks generated with respect to the most recent I-frame or P-frame of the video signal produced at the output of the summer function 124), and the motion vector(s) MV' received from the motion vector processor 130, to calculate the values for each of a plurality of scaled predicted macroblocks forming a scaled predicted information data vector S6.

As previously noted, the interpolation function 126 operates in the pixel domain to insert one or more additional lines of pixels between selected ones of existing rows or lines of pixels in a pixel block being processed. The number of lines inserted depends upon the difference between, e.g., the input video format and the native display or video processing format. For example, the conversion from 480 line to 1080 line is a 4:9 conversion ration, the conversion between a 480 line and a 720 line is a 2:3 conversion ratio.

In one embodiment of the invention, the IDCT function 122 and interpolation function 126 of the allocable processor 120 are tightly integrated and operate primarily in the DCT domain. In this embodiment, the interpolation function 126 of the allocable processor 120 operate in the DCT domain to increase the vertical dimension of a pixel block by, e.g., adding extra "padding" DCT coefficients to a received DCT coefficient block prior to performing the IDCT function. For example, and 8×8 DCT coefficient block may be padded to an 8×12 or 8×DCT coefficient block and processed using DCT basis functions (i.e., coefficient matrices) appropriate to the padded DCT size.

An ATSC television receiver will need to process input video signals according to at least the ATSC recommended compression formats. These formats are shown below in Table 2. In Table 2, "P" denotes progressive scan and "I" denotes interlaced scan. It should also be noted that the frame rate numbers shown in Table 2 are integer values; the ATSC standard also allows the frame rate values to be multiplied by 1000/1001 (i.e., 59.94 Hz, instead of 60 Hz).

TABLE 2

| Active Vertical Lines | Active Pixels | Aspect Ratio | Picture Rate |
| --- | --- | --- | --- |
| 1080 | 1920 | 16:9 | 60I, 30P, 24P |
| 720 | 1280 | 16:9 | 60P, 30P, 24P |
| 480 | 704 | 16:9 and 4:3 | 60P, 60I, 30P, 24P |
| 480 | 640 | 4:3 | 60P, 60I, 30P, 24P |

The invention addresses the vertical interpolation issues with respect to converting an input video format to a native display format. Since vertical interpolation of scan-mode video necessarily requires the storage of at least two lines of video, the block-mode approach enabled by the invention results in a significant saving of memory and memory bandwidth. Moreover, the shared resources approach of the invention reduces total computational resource requirements within, e.g., an ATSC or other video processing system.

Figure 3:
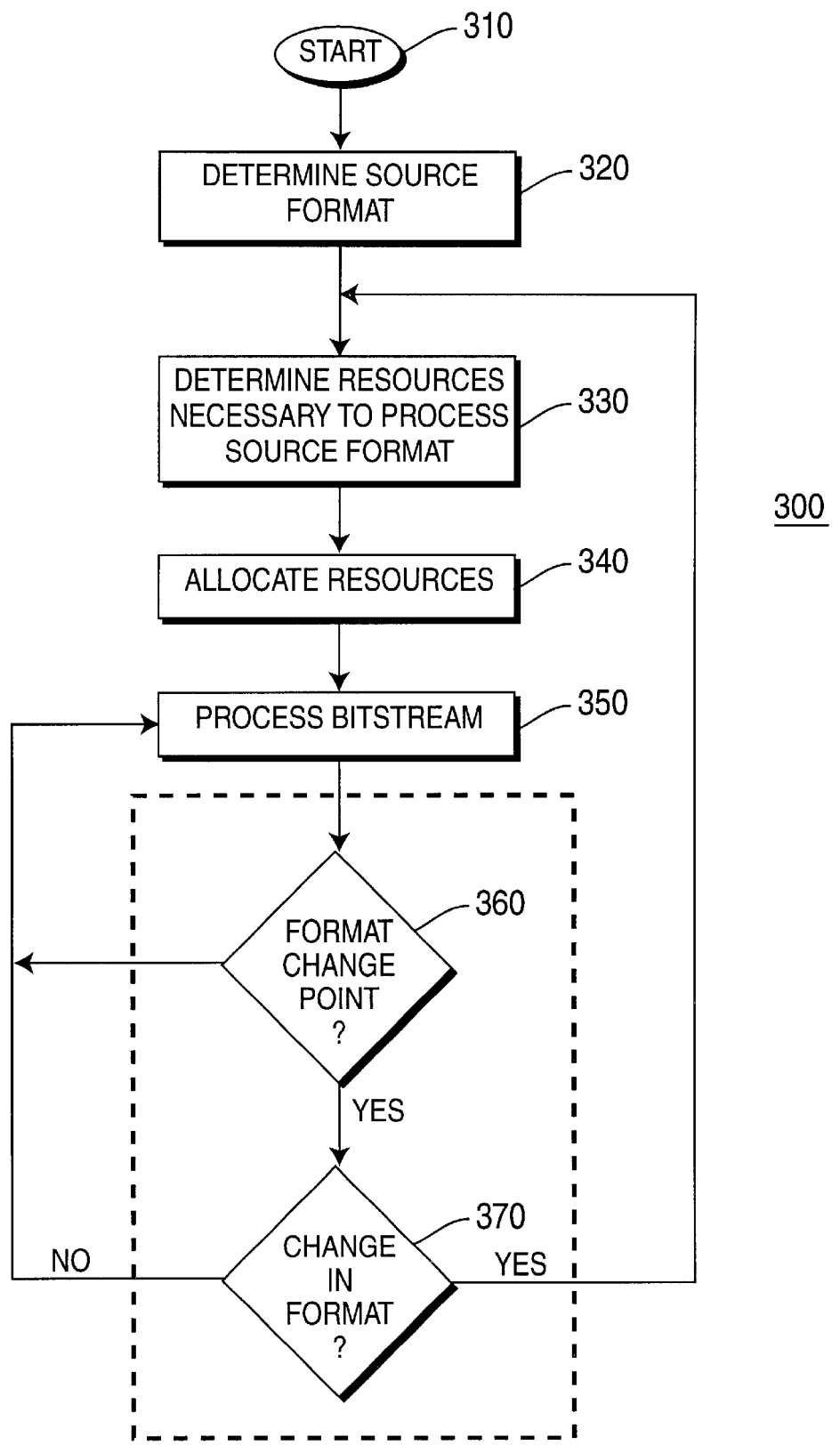
FIG. 3 depicts a flow diagram of a resource allocation method according to the invention.

FIG. 3 depicts a flow diagram of a method 300 according to the invention. Specifically, the method 300 of FIG. 3 is suitable for use in, e.g., the controller 130 of FIG. 1 or FIG. 2. Moreover, the method 300 of FIG. 3 may be readily adapted by those skilled in the art to the various alternate embodiments of the invention described with respect to FIGS. 1 and 2.

The method 300 is entered at step 310 and proceeds to step 320, where the source format of a received video stream is determined. The source format is determined with respect to, e.g., format indicative information provided to the controller 130 via the header data signal HD, as described above. The method 300 then proceeds to step 330.

At step 330 the controller determines the processing resources necessary to process a video stream having the source format determined at step 320. That is, the controller 130 determines which processing resources should be allocated to the IDCT function 122, which processing resources should be allocated to the interpolation function 126 and, optionally, which processing resources should be allocated to the block to scan-line conversion function 128. For example, an SDTV video stream requires fewer IDCT resources compared to an HDTV video stream due to the reduced number of DCT coefficients to be processed. However, as previously described, an SDTV video stream requires upconversion or interpolation to fully utilize a display area of an HDTV display device. Similarly, in the case of an HDTV video stream received as an input video stream IN to a system employing an HDTV native display format or native video processing format, a large amount of the processing resources are allocated to the IDCT function 122 of allocable processor 120. In the case of a input video stream IN comprising a lower resolution picture (e.g., a 480 line or 720 line picture) allocable processing resources sufficient to process the reduced number of DCT coefficients associated with such a reduced resolution picture are allocated to the IDCT function 122. Some or all of the remaining allocable processing resources 120 are allocated to the interpolation function 126 and, optionally, the block to scan-line converter function 128. The method 300 then proceeds to step 340.

At step 340 the allocable processing resources of the allocable processor 120 are allocated between the IDCT function 122 and the interpolation function 126 according to the determination made at step 330. The method 300 them proceeds to step 350.

At step 350 the bitstream is processed. That is, the DCT coefficient block presently stored in the block memory module 114 is processed by the IDCT function 122 and, possibly, the interpolation function 126 of allocable processor 120 to produce a resulting pixel block. The resulting pixel block is coupled to summer function 124 as video stream S4 in the manner previously described. The routine then optionally proceeds to step 360.

At optional step 360, query is made as to whether a format change point within the input video stream has been reached. That is, a query is made as to whether a sequence header, beginning of an I-frame or other point within the input stream suitable for use as a format change point has been reached. The format may be changed when, e.g., a tuner/demodulator pair (not shown) or transport stream demultiplexer (not shown) has been caused (via, e.g., user manipulations of a remote control device) to couple a new video input stream IN having a different format than the present video input stream IN to the MPEG-like decoder 100 (or 200) of FIG. 1 (or FIG. 2). If the query at step 360 is answered negatively, then the routine proceeds to step 350 where the bitstream is continued to be processed (i.e., the next block is processed). If the query at step 360 is answered affirmatively, then the routine proceeds to optional step 370.

At optional step 370, a query is made as to whether there has been an actual change in the format in the input video stream. If the query at step 370 is answered negatively, then the routine proceeds to step 350 where the bitstream is continued to be processed (i.e., the next block is processed). If the query at step 360 is answered affirmatively, then the routine proceeds to step 330, where a determination of the resources necessary to process the input video stream according to the new format is calculated. Steps 360 and 370 may be ignored in many cases, e.g., where the entire routine 300 is performed automatically each time a new channel is selected.

In one embodiment of the invention, the allocation of processing resources is accomplished using software implementations of one or more of the inverse discrete cosine transform (IDCT) function 122, summer function 124, interpolation function 126 and block to scan-line converter function 128 described above with respect to the allocable processor 120. In this embodiment each of the functions to be allocated (e.g., the IDCT function 122 and the interpolation function 126) are associated with a plurality of software routines. Each of the plurality of software routines allocates to itself an appropriate amount of processing resources upon execution.

For example, an IDCT function software routine associated with the source video format (e.g., the received video format) is executed to convert the DCT coefficient blocks into pixel blocks. Similarly, an interpolation function software routine associated with the source video format and output video format (e.g., the native format of a display device) is executed to adapt the size of the pixel blocks to be coupled to the block to scan-line converter function 128. Each of the executed IDCT function and interpolation function software routines is allocates to itself an appropriate amount of processing resources upon execution. The total amount of computational and other resources reserved by the various software routines will tend to be somewhat balanced since the routines are selected based upon the source and output video formats, are designed to allocate only a necessary amount of resources, and reserve those resources in a proportionately inverse manner (i.e., IDCT function resources requirement tend to be reduce as interpolation resources tend to be increased). Thus, the software allocation of resources in a vector processing, multiple processor or other allocable computation architecture may be advantageously utilized to practice the invention.

In one embodiment of the invention the amount of processing resources provided to one or more of the inverse discrete cosine transform (IDCT) function 122, summer function 124, interpolation function 126 and block to scan-line converter function 128 is substantially fixed. This is accomplished by selecting an intermediate video format for processing and allocating the various resources based upon that intermediate video format. In this manner, the allocation of processing resources and memory between the various functions is constant. This allocation may be performed, e.g., at a factory, or upon power up of a video decoder according to the invention.

The MPEG-like decoder 100 of FIG. 1 comprises one or more integrated circuits that are designed in a manner allowing for controllable allocation of vector processing or other arithmetic and/or logic processing resources to IDCT and interpolation operations as required by the combination of, illustratively, transmitted video format and native display format. As a practical matter, the allocation of resources, such as vector processing resources, may require a slight increase in intermediate storage, since the interpolated (i.e., upconverted) pixel block (e.g., an 8×12 or 8×18 pixel block) will contain more pixels than the original pixel block (e.g., an 8×8 pixel block). However, the net result of reducing the arithmetic resources and increasing the memory requirements will be a net decrease in the semiconductor area needed to implement the required video decoder functionality on an integrated circuit. That is, by adapting the IDCT resources such that these resources are reduced depending upon the format of the input picture, even at the expense of a little additional memory, the total semiconductor "real estate" necessary to implement the integrated circuit is reduced, resulting in a substantial savings and resulting in higher yields due to, e.g., reduced complexity and smaller die size.

Although various embodiments which incorporate the teachings of the present invention have been shown and described in detail herein, those skilled in the art can readily devise many other varied embodiments that still incorporate these teachings.

What is claimed is:

1. In a system for decoding a compressed video stream, a method for comprising the steps of:

identifying a source format of said compressed video stream;

generating, based upon at least said identified source format, one or more signals indicative of a computational resource requirement suitable for processing said compressed video stream to produce a decompressed video stream having an output format;

allocating, in response to said generated signals indicative of the computational resource requirement, computational resources for performing at least an inverse discrete cosine transform (IDCT); and processing said compressed video stream to produce said decompressed video stream having said output format.

2. The method of claim 1, wherein said allocable computational resources comprise a vector processing resource.

3. The method of claim 1, wherein said decoder resource comprises a multiple processor resource.

4. The method of claim 1, wherein:

said IDCT function is associated with a plurality of IDCT function software routines, each of said IDCT function software routines being associated with a respective source format; and said allocable computational resources are allocated by executing said IDCT function software routine associated with said identified source format.

5. The method of claim 1, wherein said decoder resource is allocated between an IDCT function and an interpolation function.

6. The method of claim 5, wherein:

said IDCT function is associated with a plurality of IDCT function software routines, each of said IDCT function software routines being associated with a respective source format;

said interpolation function is associated with a plurality of interpolation function software routines, each of said interpolation function software routines being associated with at least a respective output format; and said allocable computational resources are allocated by executing a IDCT function software routine associated with said identified source format and an interpolation function associated with said output format.

7. The method of claim 1, wherein said decoder resource is allocated between an IDCT function and an block to scan-line converter function.

8. The method of claim 7, wherein:

said IDCT function is associated with a plurality of IDCT function software routines, each of said IDCT function software routines being associated with a respective source format;

said block to scan-line converter function is associated with a plurality of block to scan-line converter function software routines, each of said block to scan-line converter function software routines being associated with a respective source format and a respective output format; and said allocable computational resources are allocated by executing a IDCT function software routine associated with said identified source format and a block to scan-line converter function associated with said source format and said output format.

9. The method of claim 5, wherein:

said source format comprises a source picture resolution; and in response to an increase in said source picture resolution, said decoder resource allocated to said IDCT function is increased and said decoder resource allocated to said interpolation function is decreased.

10. The method of claim 1, wherein said step of identifying includes the step of:

extracting, from a header portion of said compressed video stream, format-related indicia comprising a picture format.

11. In a system for decoding a compressed video stream, a method for allocating computational resources comprising the steps of:

identifying a source format of said compressed video stream; generating, based upon at least said identified source format, one or more signals indicative of one or more computational resource requirements suitable for processing said compressed video stream to produce a decompressed video stream having an output format;

allocating, in response to said generated signals indicative of the one or more determined computational resource requirements, said computational resource; and processing, using said one or more allocated computational resources, said compressed video stream to produce said decompressed video stream.

12. The method of claim 11, wherein:

said one or more computational resource requirements comprise an inverse discrete cosine transform (IDCT) function and an interpolation function.

13. The method of claim 12, wherein:

said IDCT function operates to transform discrete cosine transform (DCT) blocks within said compressed video stream into pixel blocks; and in a first operating mode, said interpolation function operates to increase at least one of a number of lines and a number of pixels per line of said pixel block;

in a second operating mode, said interpolation function does not operate to increase said at least one of said number of lines and said number of pixels per line of said pixel block.

14. The method of claim 13, wherein:

said source format is associated with a video image having number of lines defined by a first value and a number of pixel per line defined by a second value;

said output format is associated with a video image having number of lines defined by a third value and a number of pixel per line defined by a fourth value; and said first operating mode is entered in response to at least one of said first value being less than said third value and said second value being less than said fourth value.

15. The method of claim 14, wherein said second operating mode is entered in response to said first value being less than said third value and said second value being less than said fourth value.

16. The method of claim 12, wherein:

said IDCT function operates to transform DCT coefficient blocks within said compressed video stream into pixel blocks; and said interpolation function operates to increase a number of lines of said pixel block, said increase in said number of lines being related to an increase in vertical size between said source video format and a native display format.

17. The method of claim 13, further comprising the step of:

resizing, using a non-allocated computational resource, at least one of a vertical size and a horizontal size of pixel blocks processed by said allocable computational resources.

18. The method of claim 11, wherein:

said one or more computational resource requirements are allocated to perform at least the steps of an inverse discrete cosine transform (IDCT) function, an interpolation function and a block to scan-line converter function;

said IDCT function operating to transform DCT coefficient blocks within said compressed video stream into pixel blocks;

said interpolation function operating to increase at least one of a number of lines and a number of pixel per line of said pixel block; and said block to scan-line function operating to convert a plurality of either said transformed pixel blocks or said interpolated pixel blocks into a plurality of video scan-lines.

19. The method of claim 18, wherein said increase in said number of lines is related to an increase in vertical size between said source video format and a native display format.

20. Apparatus for processing a compressed video stream having a source video format to produce a decompressed video stream having an output video format, comprising:

a decoder, including allocable computational resources for performing at least one of an inverse discrete cosine transform (IDCT) function, for decoding said compressed video stream to produce a decoded video stream, said decoded video stream comprising a plurality of pixel blocks; and a controller, for receiving source video format information, generating one or more signals indicative of the computational resources and adapting said allocable computational resources in response to said generated signals and said output format of said decompressed video stream.

21. The apparatus of claim 20, wherein:

said allocable computational resources perform an interpolation function; and said controller adapts said allocable computational resources to at least said IDCT function and said interpolation function.

22. The apparatus of claim 20, wherein:

said allocable computational resources perform a block to scan-line converter function; and said controller adapts said allocable computational resources to at least said IDCT function and said block to scan-line converter function.

23. The apparatus of claim 20, further comprising:

a resizer, responsive to said controller for adapting at least on of horizontal size parameter and a vertical size parameter of said decompressed video stream.

24. The apparatus of claim 21, wherein said IDCT function operates to produce a reduced size pixel block according to a scaling factor, and said apparatus further comprises:

a motion vector processor, for receiving motion vector information associated with a predicted pixel block and producing therefrom a scaled motion vector according to said scaling factor.

25. The method of claim 1 wherein the one or more generated signals is selected from the group consisting of: a vertical size control signal, a horizontal size control signal, a frame rate control signal, vector processing resource control signal and a resolution size control signal.

26. The method of claim 1 further comprising after the step of processing said compressed video stream to produce said decompressed video stream having said output format, the step of:

determining whether a source format change has occurred in the compressed video stream.

27. The method of claim 11 wherein the one or more generated signals is selected from the group consisting of: a vertical size control signal, a horizontal size control signal, a frame rate control signal, vector processing resource control signal and a resolution size control signal.

28. The method of claim 11 further comprising after the step of processing said compressed video stream to produce said decompressed video stream having said output format, the step of:

determining whether a source format change has occurred in the compressed video stream.

29. The apparatus of claim 20 wherein the one or more generated signals is selected from the group consisting of: a vertical size control signal, a horizontal size control signal, a frame rate control signal, vector processing resource control signal and a resolution size control sign.

* * * * *

UNITED STATES PATENT AND TRADEMARK OFFICE
CERTIFICATE OF CORRECTION

PATENT NO. : 6,549,577 B2
DATED : April 15, 2003
INVENTOR(S) : Dinei Afonso Ferreira Florencio et al.

It is certified that error appears in the above-identified patent and that said Letters Patent is hereby corrected as shown below:

Column 11,
Line 49, please change "at Least" to -- at least --.

Column 12,
Line 46, please change "¼and" to -- ¼ and --.

Column 13,
Line 31, please change "or 8xDCT" to -- or 8x18 DCT --.

Column 17,
Line 31, beginning with "generating, based upon at least", should be a new paragraph and not part of paragraph above.

Signed and Sealed this

Second Day of September, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,549,577 B2
DATED : April 15, 2003
INVENTOR(S) : Florencio, Dinei Afonso Ferreira, Freeman, Smith and Reitmeier, Glen Arthur It is certified that error appears in the above-identified patent and that said Letters Patent is hereby corrected as shown below:

Column 16,
Line 19, delete "for".
Line 33, delete "allocable".
Lines 35-36, change "decoder resource comprises" to -- computational resources comprise --.
Lines 38, 49 and 65, delete "function".
Line 42, delete "allocable".
Line 43, insert -- one of -- before "said".
Lines 45 and 61, change "decoder resource" to -- computational resources are --.
Lines 46 and 62, delete "is" and "function".
Line 57, delete "allocable".
Line 62, change "an" (first occurrence) to -- said --.
Line 62, change "an" (second occurrence) to -- a --.

Column 17,
Line 9, delete "allocable".
Line 18, change "decoder resource" to -- computational resources --.
Line 19, delete "function".
Line 19, change "function is increased" to -- are increased --, and change "decoder resource" to -- computational resources --.
Line 20, change "is" to -- are --.

Column 18,
Line 12, delete "video".
Line 18, insert -- transformed -- before "pixel blocks".
Line 29, change "increase" to -- produce interpolated pixel blocks by increasing --.
Line 30, change "pixel" to -- pixels --.

UNITED STATES PATENT AND TRADEMARK OFFICE
CERTIFICATE OF CORRECTION

PATENT NO. : 6,549,577 B2
DATED : April 15, 2003
INVENTOR(S) : Florencio, Dinei Afonso Ferreira, Freeman, Smith and Reitmeier, Glen Arthur It is certified that error appears in the above-identified patent and that said Letters Patent is hereby corrected as shown below:

Column 18 (cont'd),
Line 31, change "pixel block" to -- transformed pixel blocks --.

Signed and Sealed this

Twentieth Day of December, 2005

JON W. DUDAS
*Director of the United States Patent and Trademark Office*